June 19, 1962 G. MILDH 3,039,598
DISCHARGE DEVICE FOR PULVEROUS OR GRANULAR MATERIAL
Filed Sept. 19, 1960
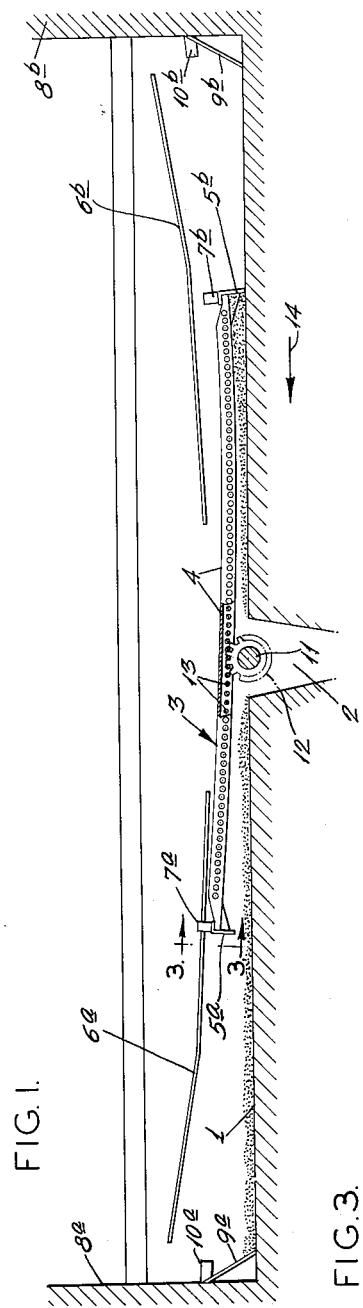
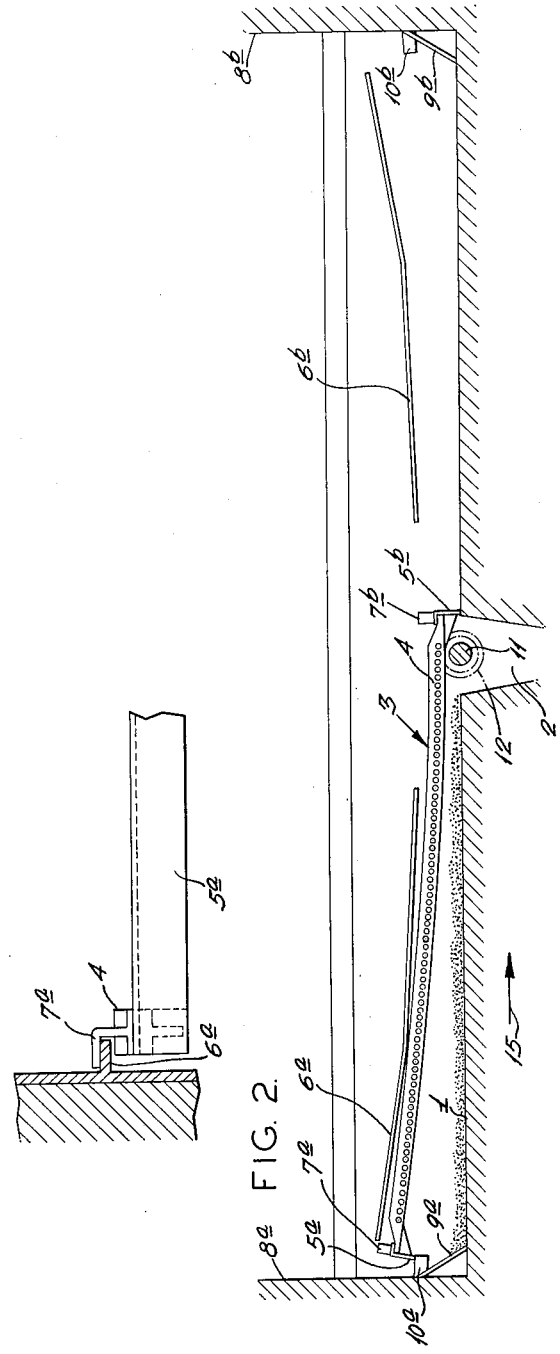
INVENTOR:
GÖSTA MILDH
BY Howson & Howson
ATTYS.

United States Patent Office 3,039,598
Patented June 19, 1962

3,039,598
DISCHARGE DEVICE FOR PULVEROUS OR GRANULAR MATERIAL
Gösta Mildh, Vattersnas, Sweden, assignor to Aktiebolaget Svenska Flaktfabriken, Nacka, Sweden
Filed Sept. 19, 1960, Ser. No. 56,915
3 Claims. (Cl. 198—224)

The present invention relates to discharging pulverous or granular material being deposited on a horizontal plane, and more particularly to means consisting of a driven scraping conveyor movable along the plane and a discharge opening extending across the whole plane transversely to the direction of movement of the scraping conveyor. Such discharge devices are often used within the industry instead of dust pockets and similar collecting means which require more space. The scraping conveyors are commonly made as endless chains provided with one or more catching means or scrapers which carry the dust towards a discharge opening arranged at one side edge of the plane. In cases where the quantity of dust accumulated per unit of time is great, it is difficult to push away the dust in this manner without operating the conveyor at unsuitable velocities. Furthermore the dust often is very abrasive which makes it difficult to use chains and similar conventional transporting elements.

The primary object of invention is to eliminate the above mentioned drawbacks. More specifically the invention is characterized by locating the discharge opening at or adjacent the center of the plane and by using as a scraping means a frame work moving forwards and backwards with a length in the moving direction corresponding to half the length of the plane in the same direction and having at its leading and trailing ends scraping edges. Guides are arranged for the frame work and are so designed that only the scraping edge which is trailing with respect to the actual moving direction rests on the plane while the other scraping edge at the same time is held out of action raised well above said plane.

According to a preferred embodiment of the invention object the forward and backward movement is imparted to the scraping means by means of cog-wheels arranged on a transverse shaft to engage gear-racks arranged on the scraping means. Because the transport distance now has been shortened to a half of its usual value, an intensive discharge now can be carried out with a suitable velocity of the scraping means. Partly because of this fact and partly because the number of the movable parts has been reduced, the abrasion is reduced to a minimum.

The invention will now be described more in detail with reference to the accompaning drawing illustrated and exemplifying embodiment of the device according to the invention and wherein FIG. 1 shows a longitudinal cross section through the discharge device;

FIG. 2 shows a corresponding cross section with the scraping means in another position; and FIG. 3 shows a transverse cross section taken on the line 3—3 of FIG. 1.

In the drawing a substantially horizontal plane 1 for collecting downfalling dust has at or adjacent its center a discharge opening 2. The invention provides scraping means 3 consisting of a frame work 4 operable to move forwards and backwards. The framework 4 as at its leading and trailing ends has depending scraping edges 5a and 5b respectively. The framework is guided in its longitudinal movement by guides 6a and 6b respectively extending above the plane 1 at opposite sides of the center opening 2, and cooperating slides 7a and 7b respectively arranged on said frame work. The guides are so made that only the trailing scraping edge with respect to the actual moving direction rests on the plane while the other scraping edge at the same time is held raised out of action well above said plane. As is evident from the drawing, the guides 6a, 6b do not extend over the center part including the discharge opening nor do they extend to the end walls 8a, 8b terminating the plane. When the scraping mean completes its leftward movement from its position illustrated in FIG. 1 and has reached its limit position shown in FIG. 2, the slide 7a disengages the guide 6a with the result that this end of the scraping means falls and causes the scraping edge 5a to come in contact with the plane 1, i.e. the scraping edge assumes a working position for the movement of the scraping means in an opposite direction as a result, the slide 7b is lifted up to the guide 6b and keeps the scraping edge 5b in raised position, out of action. In order to prevent the accumulation of dust in the corners which the scraping means cannot reach close to the end walls 8a, 8b there are arranged slanting planes 9a and 9b respectively. In order that the slanting planes shall not hinder the movement of the scraping means as it reverses, as shown by the arrows 14 and 15, and in order to obtain at the same time a softening of the down-stroke against the plane there are projections 10a, 10b mounted on the endwalls 8a and 8b to support the scraping means during a part of the reversing procedure.

To give the scraping means its forward and backward movement in the illustrated embodiment a transverse shaft 11, driven by a reversible motor not shown in the drawing, is equipped with two cog-wheels 12 which engage and drive gear racks 13 arranged on the scraping means. In the present instance, the racks are manufactured as a number of pins fastened between the flanges of the inverted U-shaped side frames. Because of this design, both the cog-wheels and the racks are kept free from dust deposits which otherwise would interfere with the running of the device and wear out the equipment.

Without departing from the invention, the scope and design in detail of the different parts of the device illustrated and described herein may be varied. For discharge planes having a large extension in length it may be suitable to arrange a number of scraping means located in sequence and all driven by one drive means or each driven by separate driving means and—if required—with mutually offset positions for the scraping means.

What I claim is:

1. A scraping conveyor for discharging pulverous or granular material being deposited on a horizontal plane having a discharge opening adjacent the transverse centerline thereof and extending transversely across the full width thereof, said conveyor comprising a framework having a length corresponding to one-half the longitudinal length of said plane and movable longitudinally thereover, scraping edges at the opposite ends of said frame, and drive means to reciprocate said frame longitudinally between opposite limit positions in which said edges are disposed in alternation over said discharge opening, said drive means including guide means for said framework operable upon movement of said frame to dispose the trailing scraping edge in scraping engagement with said plane as it travels toward said opening at one side of the transverse centerline of the plane and to dispose the leading scraping edge well above said plane as it travels away from said opening at the other side of the transverse centerline of the plane.

2. A scraping conveyor according to claim 1 wherein said framework is rigid, and said scraping edges comprise depending blades rigidly connected thereto, said drive means including a support for said framework adjacent the transverse centerline of said plane engaging said frame intermediate said edges, said guide means being operable to pivot said framework on said support at each limit position thereof to dispose said scraping edges alternatively in scraping engagement with said plane.

3. A scraping conveyor according to claim 2 wherein said framework includes rack means extending longitudinally thereof, said support comprising a gear wheel engaging said rack and driven alternately in opposite directions to displace said rack and thereby said framework between its opposite limit position.

References Cited in the file of this patent

UNITED STATES PATENTS

| | | |
|---|---|---|
| 37,467 | Vice | Jan. 20, 1863 |
| 2,013,858 | Lawlor | Sept. 10, 1935 |
| 2,522,888 | Nickerson | Sept. 19, 1950 |
| 2,681,132 | Knutson | June 15, 1954 |